United States Patent
Lee et al.

(10) Patent No.: US 9,692,070 B2
(45) Date of Patent: Jun. 27, 2017

(54) CARBON SUBSTRATE FOR GAS DIFFUSION LAYER, GAS DIFFUSION LAYER USING THE SAME, AND ELECTRODE FOR FUEL CELL, MEMBRANE-ELECTRODE ASSEMBLY AND FUEL CELL COMPRISING THE GAS DIFFUSION LAYER

(71) Applicants: JNTC Co., Ltd., Hwaseong-si, Gyeonggi-do (KR); JNTG Co., Ltd., Hwaseong-si, Gyeonggi-do (KR)

(72) Inventors: Eun Sook Lee, Suwon-si (KR); Do Hun Kim, Hwaseong-si (KR); Eun Chong Kim, Gunpo-si (KR); Jy Young Jyoung, Suwon-si (KR); Jung Mi Gwak, Suwon-si (KR); Sang Jin Choi, Yongin-si (KR); Tae Nyun Kim, Hwaseong-si (KR); Jung Kyu Lee, Osan-si (KR)

(73) Assignees: JNTG Co., Ltd. (KR); JNTC Co., Ltd. (KR)

( * ) Notice: Subject to any disclaimer, the term of this patent is extended or adjusted under 35 U.S.C. 154(b) by 881 days.

(21) Appl. No.: 13/932,673

(22) Filed: Jul. 1, 2013

(65) Prior Publication Data
US 2014/0011118 A1    Jan. 9, 2014

(30) Foreign Application Priority Data

Jun. 29, 2012  (KR) .................. 10-2012-0071397
Feb. 26, 2013  (KR) .................. 10-2013-0020683

(51) Int. Cl.
*H01M 8/10*    (2016.01)
*D21H 13/50*   (2006.01)
(Continued)

(52) U.S. Cl.
CPC ......... *H01M 8/1002* (2013.01); *C04B 35/521* (2013.01); *C04B 35/56* (2013.01);
(Continued)

(58) Field of Classification Search
CPC ... H01M 8/0245; H01M 8/0234; H01M 4/861
See application file for complete search history.

(56) References Cited

U.S. PATENT DOCUMENTS

2003/0165740 A1   9/2003  Edwards et al.
2005/0233203 A1*  10/2005 Hampden-Smith ...... B01J 21/18
                                                      429/482
2012/0094215 A1*  4/2012  Satou ................ H01M 4/8605
                                                      429/516

FOREIGN PATENT DOCUMENTS

JP    2000299113 A    10/2000
JP    2005100748 A     4/2005
(Continued)

OTHER PUBLICATIONS

Definition of Carbonization, the Carbon Terminology Dictionary, Agne Shohusa Co., Ltd., 2000, first edition, p. 215; Definition of Coefficient of Thermal Expansion, the Carbon Terminology Dictionary, Agne Shohusa Co., Ltd., 2000, first edition, p. 282, 7 pages.
(Continued)

*Primary Examiner* — Barbara Gilliam
*Assistant Examiner* — Stephan Essex
(74) *Attorney, Agent, or Firm* — St. Onge Steward Johnston & Reens, LLC

(57) ABSTRACT

A carbon substrate for a gas diffusion layer that has a porosity gradient in a thickness direction thereof, a gas diffusion using the carbon substrate, an electrode and a membrane-electrode assembly for a fuel cell that include the gas diffusion layer, and a fuel cell including the membrane-electrode assembly having the gas diffusion layer are provided. The gas diffusion layer has improved water discharge
(Continued)

ability and improved bending strength both in the machine direction and cross-machine direction.

8 Claims, 13 Drawing Sheets

(51) Int. Cl.
*H01M 4/86* (2006.01)
*H01M 8/0234* (2016.01)
*H01M 8/0245* (2016.01)
*D21H 27/08* (2006.01)
*D21H 13/12* (2006.01)
*D21H 13/14* (2006.01)
*D21H 13/16* (2006.01)
*D21H 15/02* (2006.01)
*D21H 17/11* (2006.01)
*D21H 21/52* (2006.01)
*H01M 8/0243* (2016.01)
*C04B 35/52* (2006.01)
*C04B 35/56* (2006.01)
*C04B 35/80* (2006.01)
*C04B 35/83* (2006.01)
*H01M 4/88* (2006.01)

(52) U.S. Cl.
CPC ............ *C04B 35/806* (2013.01); *C04B 35/83* (2013.01); *D21H 13/12* (2013.01); *D21H 13/14* (2013.01); *D21H 13/16* (2013.01); *D21H 13/50* (2013.01); *D21H 15/02* (2013.01); *D21H 17/11* (2013.01); *D21H 21/52* (2013.01); *D21H 27/08* (2013.01); *H01M 4/861* (2013.01); *H01M 8/0234* (2013.01); *H01M 8/0243* (2013.01); *H01M 8/0245* (2013.01); *C04B 2235/526* (2013.01); *C04B 2235/5248* (2013.01); *C04B 2235/5252* (2013.01); *C04B 2235/5264* (2013.01); *C04B 2235/5268* (2013.01); *C04B 2235/5272* (2013.01); *C04B 2235/616* (2013.01); *C04B 2235/775* (2013.01); *H01M 4/8807* (2013.01)

(56) References Cited

FOREIGN PATENT DOCUMENTS

| | | |
|---|---|---|
| JP | 2007227008 A | 9/2007 |
| JP | 2008277093 A | 11/2008 |
| JP | 2009277370 A | 11/2009 |
| KR | 20070079423 A | 8/2007 |
| WO | 0180334 A2 | 10/2001 |

OTHER PUBLICATIONS

Non-Final Rejection, Japanese Patent Application No. 2013-138356, Issued: May 30, 2014, 17 pages.
Koujien (Japanese Language Dictionary), 1983, third edition, p. 1961, 4 pages.
European Search Report, Application No. 13 17 4539, Completed: Dec. 17, 2013; Mailing Date: Jan. 7, 2014, 4 pages.
Jeong Hwan Chun, et al.; "Development of a Novel Hydrophobic/Hydrophilic Double Micro Porous Layer for Use in a Cathode Gas Diffusion Layer in PEMFC"; International Journal of Hydrogen energy 36(2011) 8422-8428.

* cited by examiner

AIR SIDE

BELT SIDE

AIR SIDE

BELT SIDE

CARBON SUBSTRATE FOR GAS DIFFUSION LAYER, GAS DIFFUSION LAYER USING THE SAME, AND ELECTRODE FOR FUEL CELL, MEMBRANE-ELECTRODE ASSEMBLY AND FUEL CELL COMPRISING THE GAS DIFFUSION LAYER

FIELD OF THE INVENTION

The present invention relates to a carbon substrate, a gas diffusion layer using the same, and an electrode for a fuel cell including the gas diffusion layer. More particularly, the present invention relates to a carbon substrate having good water discharge ability due to an appropriate porosity gradient in a thickness direction thereof that facilitates water discharge and having improved mechanical strength, a gas diffusion layer using the carbon substrate, an electrode for fuel cells that includes the gas diffusion layer.

The present invention is a product of research projects supported by Korea Institute of Energy Technology Evaluation and Planning (Project ID. 2011301003007D-21-1-000) and Korea Institute for Advancement of Technology (South-East Regional Project).

BACKGROUND OF INVENTION

Fuel cells may be classified as polymer electrolyte membrane fuel cells (PEMFC), phosphoric acid fuel cells, molten carbonate fuel cells, solid oxide fuel cells, alkaline aqueous solution fuel cells (AFCs), or the like, according to the type of electrolyte used. The operating temperature of a fuel cell and the materials of parts thereof vary depending on the electrolyte used.

PEMFCs have a low operating temperature, high efficiency, high current density, high power density, short starting time, and a rapid response speed in response to a load change, relative to other fuel cells.

PEMFCs may be classified into direct methanol fuel cells using methanol fuel and hydrogen fuel cells using hydrogen fuel. A PEMFC has a stack structure of a plurality of membrane-electrode assemblies (MEA), each including a fuel electrode (anode) and an air electrode (cathode) each having a catalyst layer disposed respectively on gas diffusion layers (GDLs) disposed on opposite sides of a polymer electrolyte membrane. A GDL may be obtained by coating a carbon substrate as a porous carbon membrane with a microporous layer (MPL) onto which a catalyst layer is disposed.

To improve performance of a PEMFC, smooth introduction of fuel such as hydrogen, and an oxidant such as pure oxygen or air into the anode and the cathode, respectively, so as to diffuse into the catalyst layer is needed for smooth oxidation/reduction reaction in the catalyst layer. In particular, diffusion efficiencies of fuel and oxygen into the catalyst layer rely on the discharge rate of water produced in the cathode, and thus an effective water discharge structure for discharging water out of the fuel cell is important for the fuel cell. That is, a structure allowing smooth introduction of fuel and oxidant into the anode and cathode, respectively, so as to diffuse into the catalyst layer and smooth discharging of byproducts such as water out of the electrode is important for a fuel cell. Water flooding in the cathode may be a cause of sudden performance deterioration of the MEA.

Korean Patent Publication No. 2007-0079423 discloses a technology of manufacturing a gas diffusion layer with a uniform pore distribution without a crack in a microporous layer to allow smooth and uniform supply of fuel and reaction gas into a catalyst layer in order to increase catalyst utilization efficiency.

However, microporous layers and gas diffusion layers including the same known so far are still not satisfactory in water discharge ability, thereby further improvement in this regard still being necessary. To improve performance of a fuel cell in a high current density condition, heavily dependent upon water discharge ability, there is a need to improve the water discharge abilities of the microporous layer and, thus, the gas diffusion layer.

SUMMARY OF THE INVENTION

The present invention provides a carbon substrate for a gas diffusion layer, the carbon substrate having improved water discharge ability and improved mechanical strength, specifically in bending strength.

The present invention also provides a gas diffusion layer for a fuel cell, the gas diffusion layer including the carbon substrate for a gas diffusion layer.

The present invention also provides an electrode for a fuel cell, the electrode including the gas diffusion layer.

According to an aspect of the present invention, there is provided a carbon substrate for a gas diffusion layer, as a porous carbon substrate with first and second surfaces opposite to each other, the carbon substrate including:
  at least two types of carbon fibers having different lengths and randomly disposed to form a non-woven fabric; and a carbide of an organic polymer disposed between the carbon fibers to bind the same,
  wherein first carbon fibers having shorter lengths are predominantly disposed to be closer to the first surface of the carbon substrate in a thickness direction of the carbon substrate, and second carbon fibers having longer lengths than the first carbon fibers are predominantly disposed to be closer to the second surface of the carbon substrate, so that the carbon substrate has a porosity gradient in the thickness direction of the carbon substrate that increases toward the second surface from the first surface of the carbon substrate.

In an embodiment, the carbon substrate may have a density gradient in the thickness direction of the carbon substrate that decreases toward the second surface from the first surface of the carbon substrate.

In an embodiment, the first and second carbon fibers may have a length from about 3 mm to about 25 mm, and a length difference between the first and second carbon fibers may be from about 3 mm to about 20 mm.

In an embodiment, a large pore having a width of about 300 μm to about 900 μm, and a medium pore or small pore having a width of about 10 μm or greater to less than 300 μm are co-present in the second surface, and a medium or small pore having a width of about 10 μm to about 100 μm may be uniformly distributed in the first surface.

According to another aspect of the present invention, there is provided a gas diffusion layer for a fuel cell, including: the carbon substrate according to an aspect of the present invention; and a microporous layer disposed on the first surface of the carbon substrate and having an average pore size in the middle thereof that is smaller than an average pore size of the carbon substrate in a region adjacent to the microporous layer.

In an embodiment, the microporous layer may have a porosity gradient in the thickness direction of the carbon substrate such that the pore size thereof increases toward the second surface from the first surface.

In an embodiment, the microporous layer may includes carbon powder, thermoexpandable graphite, and a fluorine-based binder fused between the carbon powder and the thermoexpandable graphite.

In an embodiment, an amount of the thermoexpandable graphite may increase toward the second surface from the first surface in the thickness direction of the carbon substrate, wherein the microporous layer may include a sequential stack structure of a first microporous layer and a second microporous layer, and an amount of the thermoexpandable graphite in the first microporous layer is larger than that in the second microporous layer, and wherein the amount of the thermoexpandable graphite in the first microporous layer may be from about 5 parts to about 20 parts by weight based on 100 parts by weight of a total weight of the carbon powder and the thermoexpandable graphite, and the amount of the thermoexpandable graphite in the second microporous layer may be from about 5 parts to about 10 parts by weight based on 100 parts by weight of a total weight of the carbon powder and the thermoexpandable graphite.

According to another aspect of the present invention, there is provided a gas diffusion layer for a fuel cell, comprising:

a porous carbon substrate comprising a plurality of carbon fibers randomly disposed to form a non-woven fabric, and a carbide of an organic polymer disposed between the carbon fibers to bind the same; and a microporous layer disposed on a surface of the carbon substrate, wherein the microporous layer comprises carbon powder, thermoexpandable graphite, and a fluorine-based binder fused between the carbon powder and the thermoexpandable graphite, the microporous layer has an average pore size smaller than an average pore size of a region of the carbon substrate adjacent to the microporous layer, and the microporous layer has a porosity gradient in a thickness direction of the microporous layer that decreases toward a surface of the microporous layer opposite to and away from a surface thereof adjacent to the carbon substrate.

In an embodiment, an amount of the thermoexpandable graphite may decrease in the thickness direction of the microporous layer toward the surface of the microporous layer opposite to and away from the surface thereof adjacent to the carbon substrate.

In an embodiment, the microporous layer may include a sequential stack structure of a first microporous layer and a second microporous layer, and an amount of the thermoexpandable graphite in the first microporous layer is larger than that in the second microporous layer.

In an embodiment, the amount of the thermoexpandable graphite in the first microporous layer may be from about 5 parts to about 20 parts by weight based on 100 parts by weight of a total weight of the carbon powder and thermoexpandable graphite, and the amount of the thermoexpandable graphite in the second microporous layer may be from about 5 parts to about 10 parts by weight based on 100 parts by weight of a total weight of the carbon powder and thermoexpandable graphite.

According to another aspect of the present invention, there is provided an electrode for a fuel cell, including the gas diffusion layer according to an aspect of the present invention or according to another aspect of the present invention, and a catalyst layer disposed on the microporous layer of the gas diffusion layer.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Figure 1:
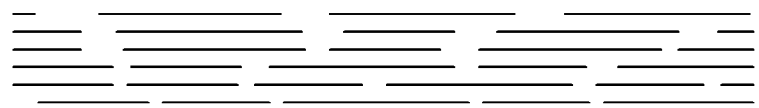
FIG. 1 is a schematic cross-sectional views of a carbon substrate for a gas diffusion layer, according to an embodiment of the present invention.

The invention now will be described more fully hereinafter with reference to the accompanying drawings, in which illustrative embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. As used herein, the term "and/or" includes any and all combinations of one or more of the associated listed items. Expressions such as "at least one of," when preceding a list of elements, modify the entire list of elements and do not modify the individual elements of the list.

Hereinafter, embodiments of a carbon substrate for a gas diffusion layer, a gas diffusion layer using the carbon substrate, and an electrode including the gas diffusion layer, a membrane-electrode assembly including the electrode, and a fuel cell including the membrane-electrode assembly will be described in greater detail.

A polymer electrolyte membrane fuel cell (PEMFC) with high power output produces a large amount of water. However, without efficient discharge of such water, water flooding may occur blocking flow of a fuel gas and an oxidant gas into a catalyst layer, and consequently causing sudden deterioration of cell performance in a high current density region for outputting a high current. To address these drawbacks, the present invention discloses a carbon substrate for a gas diffusion layer with improved water discharge ability developed to suppress cell performance deterioration caused by water flooding and to improve mechanical characteristics of the carbon substrate, thus the gas diffusion layer and the electrode.

According to an aspect of the present invention, there is provided a carbon substrate for a gas diffusion layer, as a porous planar substrate having a first surface and a second surface opposite to each other. The carbon substrate includes at least two types of carbon fibers having different lengths and randomly disposed to form a non-woven fabric; and a carbide, i.e., a carbonized matter, of an organic polymer disposed between the carbon fibers to bind the same, wherein first carbon fibers having shorter lengths are predominantly disposed to be closer to the first surface of the carbon substrate in a thickness direction of the carbon substrate, and second carbon fibers having longer lengths than the first carbon fibers are predominantly disposed to be closer to the second surface of the carbon substrate, so that the carbon substrate has a porosity gradient in the thickness direction of the carbon substrate that increases toward the second surface from the first surface of the carbon substrate.

The carbon substrate may have a density gradient in the thickness direction of the carbon substrate that decreases toward the second surface from the first surface. The first and second carbon fibers may have a length from about 3 mm to about 25 mm, and a length difference between the first and second carbon fibers may be from about 3 mm to about 20 mm. When the lengths of the first and second carbon fibers are less than 3 mm, there may be more contact points between the first and second carbon fibers, which may lower electrical conductivity, bending strength, and tensile strength of the carbon substrate. When the first and second carbon fibers have a length longer than 25 mm, the first and second carbon fibers may agglomerate together, rather than be smoothly dispersed among them, thus having a large thickness deviation.

Diameters of the first and second carbon fibers are not specifically limited, for example, may be from about 3 μm to about 15 μm. For example, the length difference between the first carbon fiber and the second carbon fiber may be from about 3 mm to about 20 mm. When the length difference between the first and second carbon fibers is less than 3 mm, effects from the density gradient and porosity gradient may be negligible. When the length difference between the first and second carbon fibers is larger than 20 mm, a density difference between upper and lower regions of the carbon substrate in a thickness direction of the carbon substrate may be so large to reduce mechanical strength, likely causing bending of the carbon substrate in a direction. Accordingly, the first and second carbon fibers may have a length difference from about 5 mm to about 20 mm.

A large pore having a width of about 300 μm to about 900 μm, and a medium pore or small pore having a width of about 10 μm or greater to less than 300 μm are co-present in the second surface, and a medium or small pore having a width of about 10 μm to about 100 μm is uniformly distributed in the first surface, so that the carbon substrate has a porosity gradient in the thickness direction of the carbon substrate that increases toward the second surface from the first surface of the carbon substrate. The carbon substrate may have a density gradient in the thickness direction of the carbon substrate that decreases toward the second surface from the first surface.

To improve electrical conductivity, the carbon substrate may further include carbon power. The carbon powder may be at least one selected from the group consisting of carbon black, carbon aerosols, carbon nanotubes, carbon nanofibers, carbon nanohorns, and natural or synthetic graphite powder.

Hereinafter, a method of manufacturing the carbon substrate for a gas diffusion layer will be described in greater detail.

First, a wire mesh is put into a dispersion of a plurality of carbon fibers in at least two types dispersed in a dispersion medium to form a carbon fiber preweb. Based on that floating times of carbon fibers dependent on the lengths of carbon fibers, the forming of the carbon fiber preweb may be controlled until the carbon fibers are deposited on the wire mesh in the dispersion medium in a manner that first carbon fibers having a shorter length are deposited predominantly on the mesh wire side (belt side), and then second carbon fibers having a longer length than the first carbon fibers are deposited predominantly thereon.

In manufacturing the carbon fiber substrate by a wet-laid process, carbon fibers in at least two types having different lengths are co-present sufficiently dispersed in a dispersion medium in a fiber-opening machine. A dispersant may be added to lower surface energies of the carbon fibers. The carbon fibers supplied into a Fourdrinier-type paper-making machine may have different surface energies in the dispersion medium. The longer the carbon fibers, the longer the floating time. Accordingly, shorter carbon fibers with lower flowability may be deposited first on a surface of a wire mesh (belt) of the paper-making machine. In particular, while a wire belt is conveyed in the paper-making machine, shorter first carbon fibers are deposited predominantly on the surface of the wire belt in an early stage, and shorter carbon fibers and longer carbon fibers are co-deposited in an almost equal ratio in a middle stage. Then, longer second carbon fibers are deposited predominantly on an exposed surface (air side) of the wire belt. The deposition rate and weight of carbon fibers are dependent on a flowability of the dispersion medium, i.e., the supply rate and supply amount of carbon fibers supplied from a distributor of the paper-making machine, and the conveying rate of the wire belt, and so forth. The larger the supply amount of carbon fibers, the larger the density distributions in upper and lower surfaces of the carbon fiber preweb formed in the paper-making machine may become. A porosity gradient structure of the carbon fiber preweb still remains on the carbon substrate after carbonization.

The carbon fiber preweb obtained through the above-described processes may have a planar structure with a first surface and a second surface opposite to each other, the first surface as, for example, a lower surface (belt side) and the second surface as, for example, an upper surface (air side). The carbon fiber preweb may include at least two different types of carbon fibers having different lengths and randomly disposed to form a non-woven fabric. The shorter first carbon fibers are predominantly and densely disposed to be closer to the first surface of the carbon fiber preweb in a thickness direction thereof, while the longer second carbon fibers than the first carbon fibers are predominantly disposed to be closer to the second surface of the carbon fiber preweb, thereby resulting in a porosity gradient in the thickness direction of the carbon fiber preweb that increases toward the second surface from the first surface.

The dispersion may further include a binder staple fiber. For example, the binder staple fiber may be one or at least two selected from the group consisting of a polyvinyl alcohol (PVA) staple fiber, a low-melting point (LM) polyester staple fiber, a polyethylene (PE) staple fiber, a polypropylene (PP) short fiber, a cellulose staple fiber, and a pitch staple fiber.

After the formation of the carbon fiber preweb, the carbon fiber preweb is immersed in a slurry including a thermocurable resin and carbon powders, and then dried to obtain a impregnated carbon fiber preweb. The thermocurable resin may be a phenol resin, for example, a phenol formaldehyde resin. The carbon powders may be the same as carbon powders used in forming a microporous layer which will be described below. A dispersion medium of the slurry is mostly water. A water-soluble dispersant may be added to improve dispersion state of the carbon powders. The carbon powders may be at least one selected from the group consisting of carbon black, carbon aerosols, carbon nanotubes carbon nanofibers, carbon nanohorns, and natural or synthetic graphite powder.

Subsequently, heat and pressure are applied to the impregnated carbon fiber preweb to cure the thermocurable resin and compress the carbon fiber preweb. The carbon fiber preweb is heated in an inert atmosphere to carbonize the thermocurable resin, thereby obtaining a carbon substrate. Consequently, the carbon substrate is treated with a fluorine-based resin suspension or emulsion to obtain a hydrophobic carbon substrate impregnated with the fluorine-based resin. Finally, the fluorine-based resin is melt to coat the surfaces of the carbon fibers and carbon powders and gaps between the carbon fibers and between the carbon powders, thereby obtaining a water-repellent, hydrophobic carbon substrate. This hydrophobicizing is optional. The fluorine-based resin may be at least one selected from the group consisting of polytetrafluoroethylene (PTFE), a tetrafluoroethylene-perfluoroalkylvinylether (TFE-PFA) copolymer, a tetrafluoroethylene-hexafluoropropylene (FEP) copolymer, polychlorotrifluoroethylene (PCTFE), a tetrafluoroethylene-ethylene (ETFE) copolymer, and polyfluorovinylidene (PVDF).

In a method of manufacturing a carbon substrate for a gas diffusion layer, according to an embodiment of the present invention, by a Fourdrinier-type paper-making process using a mixture of first and second carbon fibers having different lengths, floating times of the carbon fibers are controlled according to the lengths of the carbon fibers to deposit the shorter first carbon fibers on a belt side of the paper-making machine at a high density. Accordingly, the belt side of the carbon substrate has a high carbon fiber distribution density and a small pore size, thus implementing the carbon substrate for a diffusion layer with a density gradient and a porosity gradient in the thickness direction of the carbon substrate. The carbon substrate for a gas diffusion layer manufactured through such improved processes may have a bending strength improved by about 30% or greater in a machine direction (MD) and in a cross-machine direction (CMD). Rather, the bending strength in the CMD is greater than the bending strength in the MD, thereby solving a problem of weak bending strength in the CMD of conventional carbon substrates. A gas diffusion layer manufactured using a carbon substrate with a carbon fiber distribution density gradient and a porosity gradient in the thickness direction thereof may induce efficient discharge of water generated during operation of a PEMFC and suppress sudden cell performance deterioration, especially in a high current density region. This may solve the problem of a weak bending strength in a CMD of conventional carbon substrates.

That is, according to a conventional wet-laid process, carbon fibers are randomly arranged, mostly in a parallel direction, in a dispersion medium, and thus have a weak binding strength and a weak mechanical strength, which consequentially weakens bending strength, tensile strength, and tearing strength. The weak bending strength and weak mechanical strength in the MD and in the CMD of the carbon substrate are main causes of reduction in durability of a fuel cell. In particular, according to the prior art, fluidity of carbon fibers may lead to a relatively high mechanical strength in the MD, while a mechanical strength in the CMD is low, which is a main cause of durability reduction in a fuel cell stack.

According to embodiments of the present invention, the carbon substrate for a gas diffusion layer may have a porosity gradient structure in which, for example, a large pore having a width of about 300 μm to about 900 μm, and a medium pore or small pore having a width of about 10 μm or greater to less than 300 μm are co-present in the second surface, and a medium or small pore having a width of about 10 μm to about 100 μm is uniformly distributed in the first surface (i.e., the lower surface, the belt side, or a surface adjacent to a fuel channel when mounted in a fuel cell), thereby solving problems with the conventional carbon substrate for a gas diffusion layer. The large pores are present not only in the second surface of the carbon substrate but also at a depth of about 30% to about 60% from the second surface in the thickness direction of the carbon substrate, along with the medium pore or small pore next thereto. The large pores may be present at a ratio of at least about 50% or greater of the length of the carbon substrate in the MD on the second surface (that is, the upper surface or air side). The carbon substrate with this structure manufactured as described above may have a bending strength enhanced both in the MD and CMD by about 30% or greater, and in particular, stronger bending strength in the CMD than that in the MD.

A carbon substrate with the structure as described above according to an embodiment of the present invention, and a gas diffusion layer including the carbon substrate may have a bending strength enhanced by about 100% to about 200% in the CMD and by about 120% to about 250% in the MD, relative to a carbon substrate manufactured by conventional processes.

Figure 2:
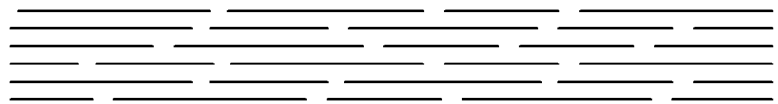
FIG. 2 is a schematic cross-sectional view of a conventional carbon substrate for a gas diffusion layer.

FIGS. 1 and 2 are comparative schematic cross-sectional views of a carbon substrate for a gas diffusion layer, according to an embodiment of the present invention, and a conventional carbon substrate for a gas diffusion layer, respectively.

Referring to FIG. 1, the carbon substrate for a gas diffusion layer, according to an embodiment of the present invention, which is manufactured by controlling floating times of carbon fibers according to the lengths of the carbon fibers in forming a carbon fiber preweb by a paper-making process, to deposit shorter first carbon fibers preferentially on a wire mesh side in a Fourdrinier-type paper-making machine, has a pore size increasing toward an upper surface from a lower surface of the carbon substrate. Meanwhile, referring to FIG. 2, the conventional carbon substrate for a gas diffusion layer has neither a porosity gradient structure in a thickness direction from a lower surface to an upper surface of the carbon substrate, nor a specific pore size distribution tendency over the cross-section of the carbon substrate.

In the conventional carbon substrate for a gas diffusion layer in FIG. 2, prepared using a general paper-making process, nearly no difference in pore size or in carbon fiber distribution density is found between a belt side on which carbon fibers are deposited through the paper-making process and an air side exposed to the air. However, in the carbon substrate for a gas diffusion layer in FIG. 1, prepared according to an embodiment of the present invention by controlling floating times of carbon fibers according to the lengths of the carbon fibers in a paper making process to predominantly deposit shorter first carbon fibers having relatively short floating times on a belt side (lower surface) of the carbon substrate at a high density to form a first surface with relatively small pores, and to predominantly deposit longer second carbon fibers having relatively long floating times on an air side (upper surface) to form a second surface with lower carbon fiber distribution density and larger pores than those on the first surface (belt side). A gas diffusion layer having a pore size, or porosity, gradient across the whole thickness thereof may be implemented by coating the first surface of the carbon substrate on which the shorter first carbon fibers are predominantly deposited at a high density to include relatively small pores, with a microporous layer also having a porosity gradient. This gas diffusion layer using the carbon substrate according to an embodiment of the present invention may efficiently discharge water produced in a catalyst layer of an electrode by strong capillary force, and thus may improve fuel cell performance, in particular, in a high current density region.

The carbon substrate for a gas diffusion layer according to an embodiment of the present invention, prepared by controlling floating times of carbon fibers according to the lengths of the carbon fibers, may have a carbon fiber distribution density gradient and a pore sized gradient in the thickness direction of the carbon substrate. The inventors found that the carbon substrate for a gas diffusion layer, according to an embodiment of the present invention, provides unexpected technical effects as follows:

(1) Improved water discharge ability of the gas diffusion layer with a porosity gradient; and
(2) Improved mechanical strengths of the carbon substrate and the gas diffusion layer.

Hereinafter, glass diffusion layers according to embodiments of the present invention will be described in greater detail.

Figure 3:
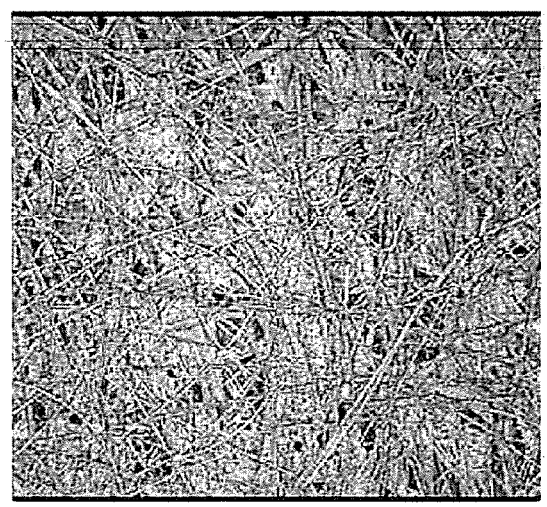
FIG. 3 is illustrates optical microscopic images of surface states of a carbon substrate for a gas diffusion layer manufactured by a conventional process.
Figure 3:
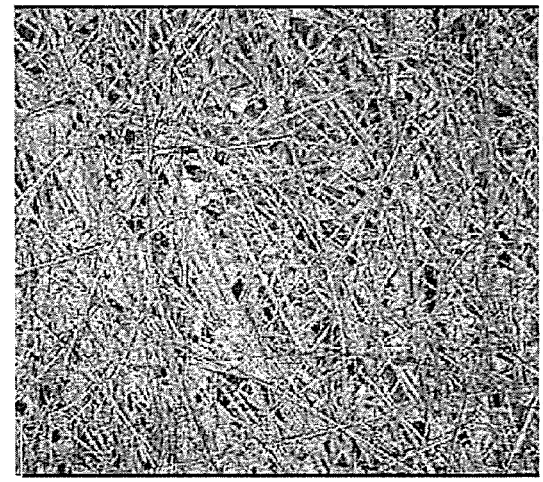

FIG. 3 illustrates optical microscopic images of surface states of a carbon substrate for a gas diffusion layer manufactured by a conventional process. Referring to FIG. 3, the carbon fiber substrate is found not to have a porosity gradient between the air side and the belt side. That is, the pore sizes of the air side and the belt side are almost same.

Figure 4:
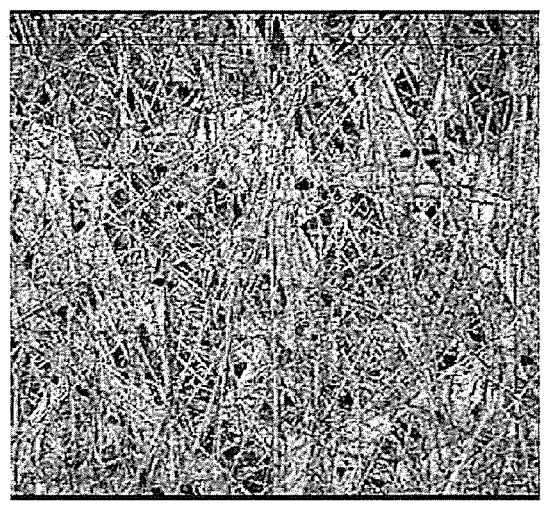
FIG. 4 is illustrates optical microscopic images of surface states of a carbon substrate for a gas diffusion layer manufactured by controlling floating times of carbon fibers according to the lengths of the carbon fibers, according to an embodiment of the present invention.
Figure 4:
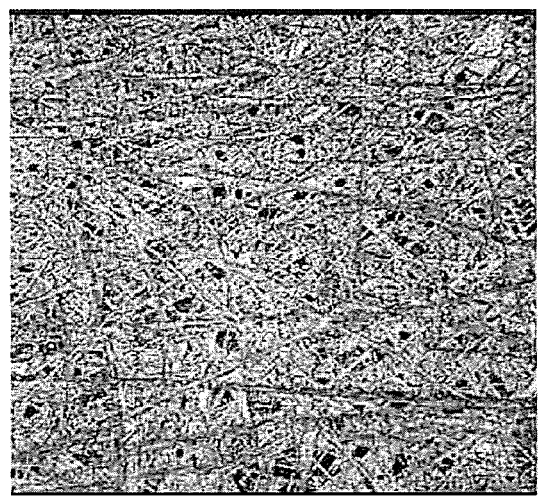

FIG. 4 illustrates optical microscopic images of surface states of a carbon substrate for a gas diffusion layer manufactured by controlling floating times of carbon fibers according to the lengths of the carbon fibers, according to an embodiment of the present invention. Referring to FIG. 4, the carbon fiber substrate according to an embodiment of the present invention is found to have a porosity gradient between the air side and the belt side. That is, in the carbon substrate of FIG. 4, carbon fibers on the air side are relatively loosely deposited to include relatively large pores, while carbon fibers on the belt side are relatively densely deposited to include relative small pores.

A gas diffusion layer according to an embodiment of the present invention may be obtained by forming any microporous layer (MPL) on a porous carbon substrate with a porosity gradient according to an embodiment of the present invention, or by forming a microporous layer (MPL) with a porosity gradient on a conventional porous carbon substrate without a porosity gradient.

According to another aspect of the present invention, a gas diffusion layer for a fuel cell includes: the carbon substrate with a porosity gradient according to an aspect of the present invention; and a microporous layer disposed on the first surface of the carbon substrate and having an average pore size in the middle thereof that is smaller than an average pore size of the carbon substrate in a region adjacent to the microporous layer. The microporous layer may have a porosity gradient in the thickness direction of the carbon substrate such that the pore size thereof increases toward the second surface from the first surface in the thickness direction of the carbon substrate. The microporous layer may include carbon powder, thermoexpandable graphite, and a fluorine-based binder fused between the carbon powder and the thermoexpandable graphite. An amount of the thermoexpandable graphite may increase toward the second surface from the first surface in the thickness direction of the carbon substrate to order to achieve the porosity gradient. The microporous layer may include a sequential stack structure of a first microporous layer and a second microporous layer, and an amount of the thermoexpandable graphite in the first microporous layer may be larger than or almost equal to that in the second microporous layer. The amount of the thermoexpandable graphite in the first microporous layer may be from about 5 parts to about 20 parts by weight based on 100 parts by weight of a total weight of the carbon powder and thermoexpandable graphite, and the amount of the thermoexpandable graphite in the second microporous layer may be from about 5 parts to about 10 parts by weight based on 100 parts by weight of a total weight of the carbon powder and the thermoexpandable graphite.

According to an embodiment of the present invention, a gas diffusion layer for a fuel cell may include: a porous carbon substrate including a plurality of carbon fibers randomly disposed to form a non-woven fabric, and a carbide of an organic polymer disposed between the carbon fibers to bind the same; and a microporous layer disposed on a surface of the carbon substrate, wherein the microporous layer may include carbon powder, thermoexpandable graphite, and a fluorine-based binder fused between the carbon powder and the thermoexpandable graphite, the microporous layer may have an average pore size smaller than an average pore size of a region of the carbon substrate adjacent to the microporous layer, and the microporous layer may have a porosity gradient in a thickness direction of the microporous layer that decreases toward a surface of the microporous layer opposite to and away from a surface thereof adjacent to the carbon substrate.

An amount of the thermoexpandable graphite may decrease in the thickness direction of the microporous layer toward the surface of the microporous layer opposite to and away from the surface thereof adjacent to the carbon substrate. The microporous layer may include a sequential stack structure of a first microporous layer and a second microporous layer, and an amount of the thermoexpandable graphite in the first microporous layer may be larger than or almost equal to that in the second microporous layer. The amount of the thermoexpandable graphite in the first microporous layer may be from about 5 parts to about 20 parts by weight based on 100 parts by weight of a total weight of the carbon powder and thermoexpandable graphite, and the amount of the thermoexpandable graphite in the second microporous layer may be from about 5 parts to about 10 parts by weight, for example less than about 10 parts by weight, based on 100 parts by weight of a total weight of the carbon powder and thermoexpandable graphite.

The thermoexpandable graphite in the microporous layer may expand by thermal treatment during a manufacturing process. Accordingly, the larger the amount of the thermoexpandable graphite in the microporous layer, the larger the porosity may become. The thermoexpandable graphite in the microporous layer may be replaced by an inorganic material thermally decomposable into vapor phase by heat, or a mixture thereof. As described above, the thermoexpandable graphite in the microporous layer may gradually change in the thickness direction thereof to form a porosity gradient structure in the microporous layer, independent from the porosity gradient structure of the carbon substrate for a gas diffusion layer.

Figure 5:
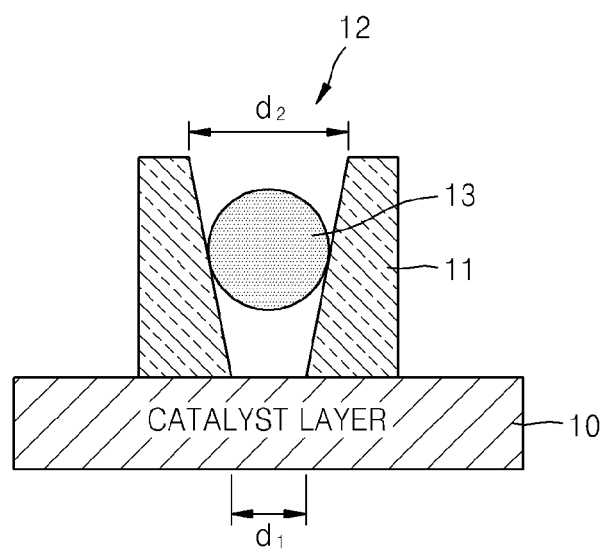
FIG. 5 is a schematic view of a structure of a microporous layer with an optimized pore distribution structure, according to an embodiment of the present invention, for facilitating water discharge.

FIG. 5 is a schematic view of a structure of a microporous layer with an optimized pore distribution structure, according to an embodiment of the present invention, for facilitating discharge of water generated during an operation of a fuel cell as described above. Referring to FIG. 5, a microporous layer 11 with a pore 12 is disposed on a catalyst layer 10. The size of the pore 12 becomes larger away from the catalyst layer 10 to improve water discharge ability, which consequentially facilitates discharge of water generated during an operation of a fuel cell out of the fuel cell. In FIG. 5, reference numeral 13 denotes a water molecule discharged through the pore 12, d1 indicates a pore diameter in a region of the microporous layer 11 adjacent to the catalyst layer 10, and d2 indicates a pore diameter in a region of the microporous layer 11 away from the catalyst layer 10.

According to embodiments of the present invention, a microporous layer with a porosity gradient as illustrated in FIG. 5 may be manufactured using thermoexpandable graphite.

Figure 6:
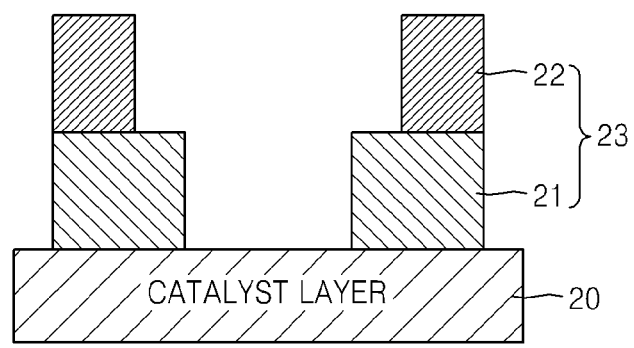
FIG. 6 is a schematic view of a structure of a microporous layer with an optimized pore distribution structure, according to another embodiment of the present invention, for facilitating water discharge.
Figure 7:
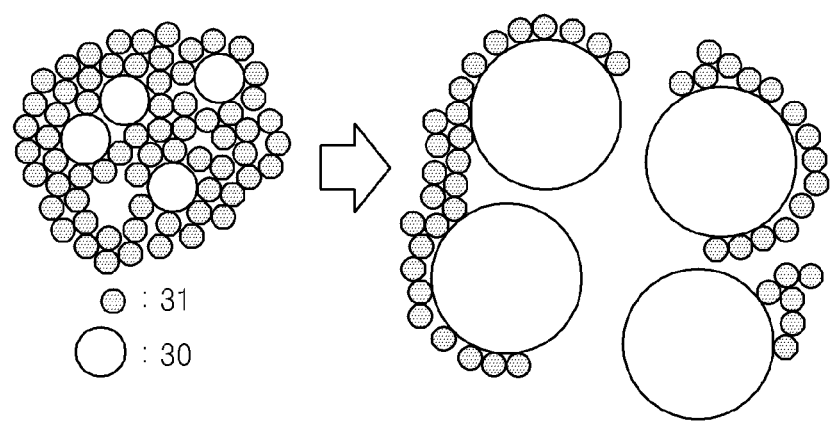
FIG. 7 is a schematic view illustrating a mechanism of pore formation using expandable graphite.

FIG. 6 is a schematic view of a pore structure of a microporous layer according to an embodiment of the present invention. Referring to FIG. 6, two microporous layers 21 and 22 with different porosities are stacked on a catalyst layer 20 to form a multilayered microporous layer 23 with different porosities in a thickness direction of thereof. The porosities of the microporous layers 21 and 22 may be controlled by using the amount of thermoexpandable graphite therein. A composition for a microporous layer including thermoexpandable graphite 30 and carbon powder 31 may be coated on the carbon substrate for a gas diffusion layer, dried, and then thermally treated. As a result, as illustrated in FIG. 7, the thermoexpandable graphite 30 may expand to form pores.

The amounts of the thermoexpandable graphite 30 in the microporous layers 21 and 22 may be controlled to be different. In particular, the microporous layer 22 may include a larger amount of thermoexpandable graphite than the microporous layer 21 to form a porosity distribution as illustrate in FIG. 6. For example, the amount of thermoexpandable graphite may increase in the thickness direction of the microporous layer 11, 23 in FIG. 5 or 6 to form a porosity gradient that increases away from the catalyst layer 10, 20. This structure may increase a capillary effect serving as a driving force for water discharge. As a result, water generated during an operation of a PFMFC may be efficiently discharged to suppress cell performance deterioration caused by water flooding. In general, a PEMFC for vehicles undergoes severe changes in output density during driving. However, when a microporous layer according to an embodiment of the present invention is used in a PEMFC for vehicles, the PEMFC may have stable, improved cell performance in a high current density region.

The microporous layer may include carbon powder and thermoexpandable graphite. The amount of thermoexpandable graphite in the microporous layer may gradually increase in the thickness of the microporous layer to form a porosity gradient that increases away from the catalyst layer.

Non-limiting examples of the thermoexpandable graphite for forming pores are Ecophit® G graphite powder and GRAFGUARD® graphite flakes. The microporous layer may be formed by using, instead of using the thermoexpandable graphite, an inorganic material thermally decomposable into vapor phase, for example, ammonium carbonate, ammonium bicarbonate, ammonium oxalate, ammonium sulfamate, ammonium thiosulfate, ammonium citrate, an organic material including other cations, or a mixture thereof.

Figure 8A:
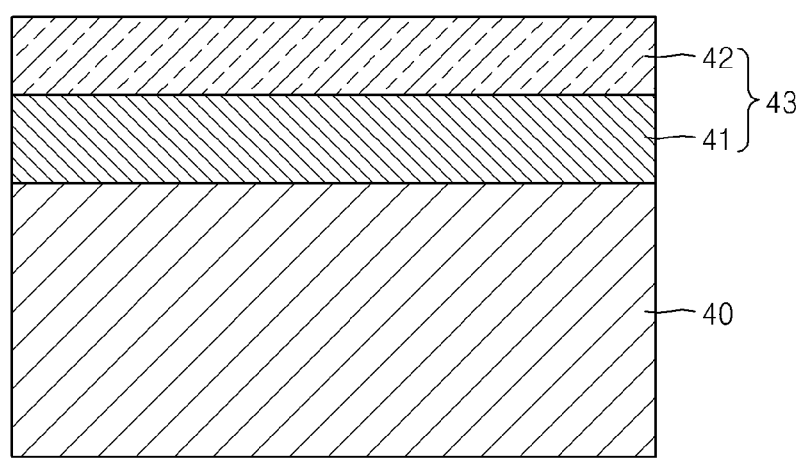
FIG. 8A is a schematic cross-sectional view of a structure of a gas diffusion layer according to an embodiment of the present invention.
Figure 8B:
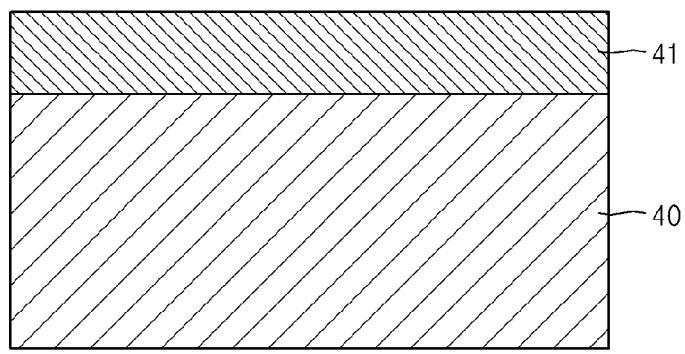
FIG. 8B is a schematic cross-sectional view of a structure of a gas diffusion layer according to another embodiment of the present invention.

FIGS. 8A and 8B are views of stacked structures of microporous layers in gas diffusion layers according to embodiments of the present invention.

Referring to FIG. 8A, a gas diffusion layer according to an embodiment of the present invention includes a microporous layer 43 on a carbon substrate 40. The microporous layer 43 includes a first microporous layer 41 on the carbon substrate 40 and a second microporous layer 42 on the first microporous layer 41. The first microporous layer 41 includes a relatively large amount of thermoexpandable graphite than the second microporous layer 42. For example, the amount of the thermoexpandable graphite in the first microporous layer 41 may be about 5 parts to about 20 parts by weight, and in some embodiments, about 10 parts to about 20 parts by weight, each based on 100 parts by weight of a total weight of the thermoexpandable graphite and the carbon powder. The amount of the thermoexpandable graphite in the second microporous layer 42 may be about 5 parts to less than about 10 parts by weight, and in some embodiments, about 5 parts to about 8 parts by weight, each based on 100 parts by weight of a total weight of the thermoexpandable graphite and the carbon powder. When the first microporous layer 41 and the second microporous layer 42 have concentration or amount gradients of thermoexpandable graphite as above, the first microporous layer 41 and the second microporous layer 42 may have porosity gradient structures in which pore sizes gradually decreases away from surfaces adjacent to the carbon substrate 40.

Referring to FIG. 8B, a gas diffusion layer according to another embodiment includes a microporous layer 41 having a single-layered structure disposed on a carbon substrate 40. For example, an amount of thermoexpandable graphite in the microporous layer 41 may be about 5 parts to about 20 parts by weight based on 100 parts by weight of a total weight of the thermoexpandable graphite and the carbon powder.

The carbon powder in the microporous layers 41, 43 is not specifically limited provided that it has porosity and electrical conductivity. For example, the carbon powder may be any of various materials having a specific surface area of less than about 500 $m^2/g$ and having no basic functional groups on a surface thereof. For example, the carbon powder may be crystalline carbon or amorphous carbon in any of various forms. The carbon powder may also be activated carbon. The carbon powder may be a combination of at least two of crystalline carbon, amorphous carbon, and activated carbon in various ratios.

The carbon powder may be commercially purchased or may be prepared for this use. For example, the carbon powder may be at least one selected from the group consisting of activated carbon, carbon black, acetylene black, ketjen black, denka black, carbon whiskers, activated carbon fiber, vapor-grown carbon fiber (VGCF), carbon aerozoles, carbon nanotubes, carbon nanofibers, carbon nanohorns, and natural or artificial graphite, or a combination thereof, but is not limited thereto. Non-limiting examples of commercially available carbon powder are carbon black, such as Vulcan XC-72 (Cabot Corp.) and Shawinigan Black, grade 55 (Chevron Phillips Chemical Company), and ketjen black such as Ketjenblack EC300J and Ketjenblack EC600JD (Akzo Nobel Chemicals Inc., Chicago, Ill.).

The microporous layers 41, 43 may further include a fluorine-based resin. The fluorine-based resin is not specifically limited provided that it may bind with a carbon material such as carbon powder. The fluorine-based resin may be water-repellent.

The fluorine-based resin may be at least one selected from the group consisting of polytetrafluoroethylene (PTFE), a tetrafluoroethylene-perfluoroalkylvinylether copolymer, a tetrafluoroethylene-hexafluoropropylene copolymer, polychlorotrifluoroethylene, a tetrafluoroethylene-ethylene copolymer, and polyfluorovinylidene (PVDF), or a combination thereof, but is not limited thereto.

An amount of the fluorine-based resin in the microporous layer may be about 2 parts to about 40 parts by weight, and in some embodiments, about 10 parts to about 35 parts by weight, and in some other embodiments, about 15 parts to about 30 parts by weight, each based on 100 parts by weight of a total solid content in the microporous layer. The total solid content may be comprised of the fluorine-based resin, the thermoexpandable graphite, and the carbon powder. When the amount of the fluorine-based resin is within these ranges based on 100 parts by weight of the total solid content, a fuel cell may have an improved cell performance without an increase in resistance of the gas diffusion layer.

The microporous layer may be manufactured using any appropriate method. For example, the microporous layer may be manufactured by preparing a composition therefor, coating a carbon substrate with the composition by using a common method known in the art, and drying a resulting product.

The composition for a microporous layer according to an embodiment of the present invention may be prepared using a method known in the art, for example, using common appropriate materials known to one of ordinary skill in the art, except that the composition further includes carbon powder and thermoexpandable graphite. Accordingly, the composition for the microporous layer may further include carbon powder and a fluorine-based resin. The composition for the microporous layer may further include a dispersant and a solvent.

For example, the composition for a microporous layer according to an embodiment of the present invention may be prepared by a method including: (a) adding carbon powder and thermoexpandable graphite into a solution including a dispersant and milling or high-speed mixing the solution to obtain a homogeneously dispersed mixture; and (b) adding a fluorine-based resin into the mixture and low-speed mixing the mixture to homogeneously disperse the fluorine-based resin in the mixture. For example, the composition for the microporous layer may include thermoexpandable graphite and fluorine-based resin in amounts within the above ranges. The composition may further include about 0.5 parts to about 25 parts by weight of a dispersant and about 50 parts to about 100 parts by weight of carbon powder, each based on 100 parts by weight of a total solid content of the composition. The composition for the microporous layer may further include a solvent or a dispersion medium to maintain a concentration of the composition at about 3 wt % to about 30 wt %.

The dispersant is not specifically limited, and may be any material able to homogeneously disperse carbon materials such as carbon powder. For example, the dispersant may be at least one selected from the group consisting of a cationic surfactant, an anionic surfactant, a non-ionic surfactant, and an amphoteric surfactant, or a combination thereof. Non-limiting examples of the dispersant are cationic surfactants, such as alkyltrimethylammonium salts, alkyldimethylbenzylammonium salts, and phosphate amine salts; anionic surfactants, such as polyoxyalkylene alkylethers, polyoxyethylene derivatives, alkyl amine oxide, and polyoxyalkylene glycol; amphoteric surfactants, such as alanines, imidazolium betaines, amidopropyl betaines, and amino dipropionic acid salts; and non-ionic surfactants, such as alkylarylpolyether alcohol. Examples of commercially available anionic surfactants are HOSTAPAL and EMULSOGEN(Clariant), DISPERSBYK (BYK), and DISPERS (TEGO). An example of commercially available non-ionic surfactant is Triton X-100. The dispersant may be a material removable via thermal decomposition at a temperature of about 250° C. to about 400° C.

In the composition for forming a microporous layer according to an embodiment of the present invention, the amounts of the dispersant and the solvent may be varied depending on the type and specific surface area of the carbon powder. For example, when using carbon powder having a large specific surface area, such as ketjen black, micropores of ketjen black may be impregnated with a large amount of the solvent, and a large amount of the dispersion may be used to improve dispersion ability. When using carbon powder having a small specific surface area, such as acetylene black, relatively small amounts of the solvent and the dispersant may be used.

After preparation of the composition for the microporous layer, the composition may be coated on a carbon substrate with a porosity gradient according to an embodiment of the present invention, or a conventional carbon substrate not having a porosity gradient, and then dried to form a microporous layer on the carbon substrate. As described above, different compositions for microporous layers may be coated on the carbon substrate to form at least two microporous layers.

Examples of the conventional carbon substrate are carbon paper, carbon fiber, carbon felt, and carbon sheets. However, using a carbon substrate for a gas diffusion layer, according to an embodiment of the present invention, with a porosity gradient structure as described above may be advantageous over using the conventional carbon substrate. The porosity gradient structure may include, for example, a large pore having a width of about 300 µm to about 900 µm, and a medium pore or small pore having a width of about 10 µm or greater to less than 300 µm that are co-present in the second surface, and a medium or small pore having a width of about 10 µm to about 100 µm uniformly distributed in the first surface (i.e., the lower surface, the belt side, or a surface adjacent to a fuel channel when mounted in a fuel cell). The carbon substrate may have a thickness of about 30 µm to about 400 µm, and in some embodiments, a thickness of about 100 µm to about 350 µm. For example, the carbon substrate may be carbon paper. Examples of commercially available carbon paper are JNT-20, JNT-30, and JNT-40 (available from JNTC Co. Ltd.). The conventional carbon substrate may be impregnated with a water-repellant polymer resin, for example, a fluorine-based resin, such as polytetrafluoroethylene, for use in manufacturing a gas diffusion layer. When the conventional carbon substrate is impregnated with a water-repellant polymer resin, an amount of the water-repellant polymer resin may be about 5 wt % or greater, for example, about 7 wt % to about 20 wt %, each based on a total weight of the carbon substrate.

The gas diffusion layers according to the above-described embodiments of the present invention may be applied in an electrolysis system such as a chloride or fluoride electrolysis system or water electrolysis system, as well as in a fuel cell, or in an energy storage system using carbon materials, such as an electric double-layer capacitor to improve performance of the electrolysis system or energy storage system. In some other embodiments, a gas diffusion layer according to an embodiment of the present invention as described above may be used in a fuel cell for hydrogen fueled cell vehicles.

The gas diffusion layers according to the above-described embodiments may be manufactured using appropriate means by appropriate methods. A method of manufacturing a gas diffusion layer according to another embodiment of the present invention will now be described in greater detail. The method of manufacturing a gas diffusion layer, according to the present embodiment, may include: coating a surface of a carbon substrate with a fluorine-based resin and thermally treating the same to obtain a water-repellant carbon substrate; preparing a composition for forming a first microporous layer and coating the same on the water-repellant carbon substrate; preparing a composition for forming a second microporous layer and coating the same on the first microporous layer; and thermally treating the resulting structure to obtain the gas diffusion layer.

In the method of manufacturing a gas diffusion layer, according to the present embodiment, the compositions for forming the first and second microporous layers may be prepared, each by adding carbon powder and thermoexpandable graphite into a solution including a dispersant and milling or high-speed mixing the solution to obtain a homogeneously dispersed mixture; and adding a fluorine-based resin into the mixture and low-speed mixing the mixture to homogeneously disperse the fluorine-based resin in the mixture.

According to another aspect of the present invention, an electrode for a fuel cell includes a carbon substrate for a gas diffusion layer as described in the above embodiments, wherein the electrode may be used as a cathode or an anode of a fuel cell.

According to another aspect of the present invention, a membrane-electrode assembly (MEA) for a fuel cell includes the electrode described above.

According to another aspect of the present invention, a fuel cell includes the membrane-electrode assembly described above.

A fuel cell according to an embodiment of the present invention is not specifically limited provided that the fuel cell includes a gas diffusion layer described in the above embodiments. For example, a fuel cell according to an embodiment of the present invention may include an anode, a cathode, and an electrolyte membrane, the anode or/and the cathode including a gas diffusion layer(s) described in the above-embodiments.

A fuel cell according to an embodiment of the present invention may be a PEMFC, a phosphoric acid fuel cell, a molten carbonate fuel cell, a solid oxide fuel cell, or an alkaline aqueous solution fuel cell, but is not limited thereto. A fuel cell according to an embodiment of the present invention including a gas diffusion layer descried in the above embodiments may be manufactured by an appropriate method known to one of ordinary skill in the art.

One or more embodiments of the present invention will now be described in detail with reference to the following examples. However, these examples are not intended to limit the scope of the one or more embodiments of the present invention.

Example 1

First, compositions for forming first and second microporous layers were prepared as follows.

(1) Preparation of Composition for Forming First Microporous Layer 1000 g of deionized water, 20 g of dispersant (TRITON X-100), 82 g of carbon black (VULCAN XC-72), 20 g of thermoexpandable graphite (ECOPHIT®G), and 8 g of a 60 wt % polytetrafluoroethylene (PTFE) dispersion were mechanically mixed together to obtain a composition for a first microporous layer.

(2) Preparation of Composition for Forming Second Microporous Layer 1,000 g of deionized water, 20 g of dispersant (TRITON X-100), 92 g of carbon black (VULCAN XC-72), 10 g of thermoexpandable graphite (ECOPHIT®G), and 8 g of a 60 wt % PTFE dispersion were mechanically mixed together to obtain a composition for a second microporous layer.

(3) Manufacture of Gas Diffusion Layer

A carbon substrate JNT30 (available from JNTC Co., Ltd.) having a thickness of about 270 µm, manufactured by conventional processes, were immersed in a 5 wt % PTFE solution (available from Du Pont) to impregnate about 10 wt % of PTFE was impregnated into the carbon substrate, followed by drying, and thermal treatment in the air at about 350° C. for about 30 minutes to obtain a water-repellant carbon substrate.

The composition for forming a first microporous layer was coated on and impregnated into the water-repellant carbon substrate to impregnate about 50 wt % of the composition into the water-repellant carbon substrate, followed by drying at about 120° C. to form the first microporous layer. The composition for forming a second microporous layer was coated on the first microporous layer and then dried to form the second microporous layer, which was then thermally treated in the art at about 350° C. for about 30 minutes to obtain a gas diffusion layer.

Comparative Example 1

A gas diffusion layer was manufactured in the same manner as in Example 1, except that the composition for forming a first microporous layer was coated thick to form the microporous layer having the same thickness as the total thickness of the first and second microporous layers of Example 1.

Comparative Example 2

A gas diffusion layer was manufactured in the same manner as in Example 1, except that the compositions for forming first and second microporous layers excluding thermoexpandable graphite were used to form the first microporous layer and the second microporous layer, respectively.

Evaluation Example 1

Pore Size Distribution and Porosity

Pore size distributions and porosities in the microporous layers of Example 1 and Comparative Examples 1 and 2 were measured using mercury intrusion porosimetry (Autopore IV 9500, available from Micromeritics Inc.). The results are shown in FIG. 9.

Figure 9:
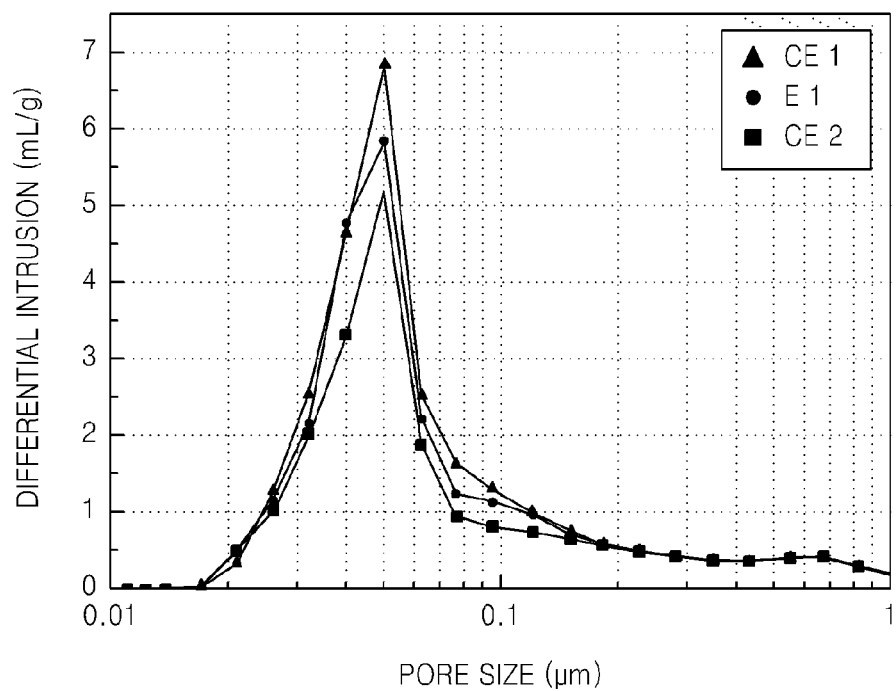
FIG. 9 is a graph of pore size distribution in microporous layers of Example 1 and Comparative Examples 1 and 2.

Referring to FIG. 9, the microporous layer in the gas diffusion layer of Example 1 is found to be smaller in total pore volume, which corresponds to a total area of the plot in FIG. 9, than the microporous layer in the gas diffusion layer of Comparative Example 1. However, as is apparent from FIG. 11, the single cell using the gas diffusion layer of Example 1 has better cell performance than the single cell using the gas diffusion layer of Comparative Example 1, due to the gas diffusion layer of Example 1 having an appropriate porosity gradient caused by controlling the amount of the thermoexpandable graphite and having a ratio gradient of appropriate hydrophilic thermoexpandale graphite to hydrophobic carbon black. The reasons for this will be discussed in more detail below.

Evaluation Example 2

Water Permeability Measurement

Water permeabilities in the gas diffusion layers of Example 1 and Comparative Examples 1 and 2 were measured using an apparatus and a method disclosed in an article (International Journal of Hydrogen Energy 36 (2011) 8422-8428) (refer to page 8423). The results are shown in FIG. 10.

Figure 10:
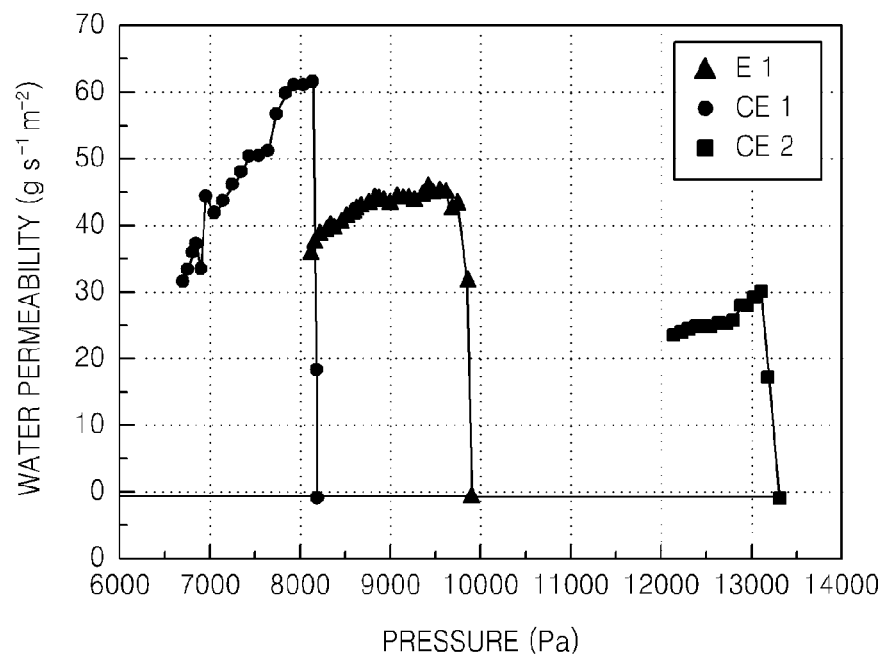
FIG. 10 is a graph of water permeability in gas diffusion layers of Example 1 and Comparative Examples 1 and 2.
Figure 11:
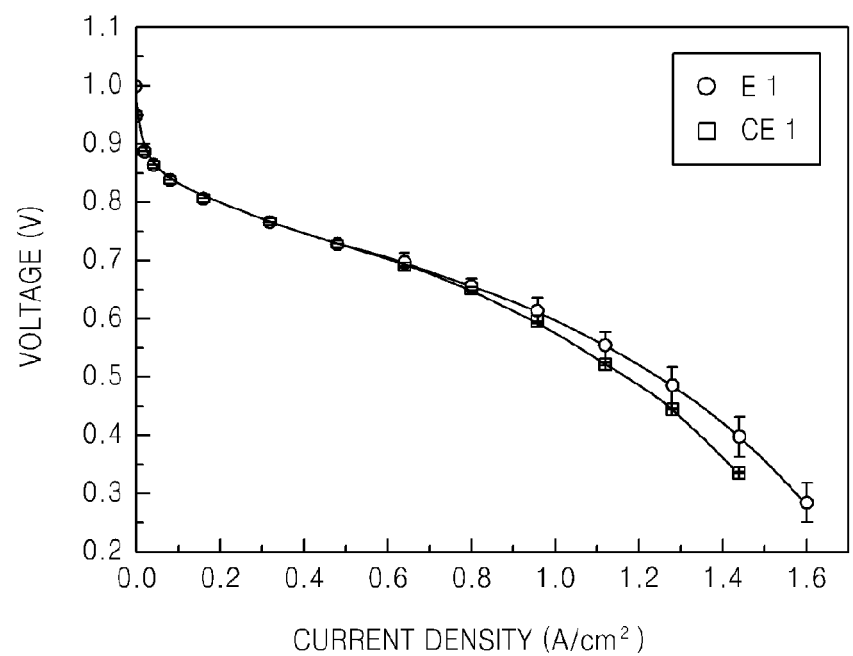
FIG. 11 is a graph of voltage with respect to current density in fuel cells including the gas diffusion layers of Example 1 and Comparative Example 1, respectively.

Referring to FIG. 10, since having a larger total pore volume than the microporous layer in the gas diffusion layer of Example 1, the microporous layer in the gas diffusion layer of Comparative Example 1 has a higher water permeability in proportional to the total pore volume. However, the water permeability of the microporous layer of Comparative Example 1 is too high, even at a low pressure. For this reason, the microporous layer of Comparative Example 1 may be more prone to uptake water to form a water pool in the gas diffusion layer. Accordingly, flow-in or flow-out of oxidant gas and fuel gas through the gas diffusion layer of Comparative Example 1 may be suppressed, so that performance of the single cell using the gas diffusion layer of Comparative Example 1 may be deteriorated in a high current density region, as is apparent from FIG. 11, compared to the single cell using the gas diffusion layer of Example 1. Since the gas diffusion layer of Example 1 has an appropriate porosity gradient caused by controlling the amount of the thermoexpandable graphite and a ratio gradient of appropriate hydrophilic thermoexpandale graphite to hydrophobic carbon black, using the gas diffusion layer of Example 1 may eliminate problems with the gas diffusion layer of Comparative Example 1. Thus, the single cell using the gas diffusion layer of Example 1 has better cell performance than the single cell using the gas diffusion layer of Comparative Example 1, as is apparent in FIG. 11.

Evaluation Example 3

Single Cell Test

The gas diffusion layer of Example 1 was used as a gas diffusion layer for an anode as well as a gas diffusion layer for a cathode. A commercially available catalyst-coated membrane (PREM EA 5710, available from Gore) was disposed between the two gas diffusion layers to manufacture an anode and a cathode. The commercially available catalyst-coated membrane is composed of a NAFION® polymer membrane (available from Dupont) with proton conductivity, and platinum (Pt) catalyst. An electrolyte membrane was sandwiched between the anode and the cathode to manufacture a single cell PEMFC. The electrolyte membrane was a NAFION® with enhanced performance (Product No #5710, available from Gore) selectively passing cations. Single cell was also prepared using the gas diffusion layer of Comparative Example 1 following the same procedure described above.

While supplying hydrogen gas to the anode and air to the cathode, voltage changes with respect to current density in the fuel cells manufactured using the gas diffusion layers of Example 1 and Comparative Example 1 were measured per an electrode area of about 25 $cm^2$ at about 65° C. and a relative humidity of 100% in an atmospheric condition. The results are shown in FIG. 11. Referring to FIG. 11, the fuel cell including the gas diffusion layer of Example 1 was found to have better cell voltage characteristics than the fuel cell including the gas diffusion layer of Comparative Example 1.

Evaluation Example 4

Thickness Measurement

A thickness of each carbon substrate or each gas diffusion layer was measured using a thickness measuring device (pressure foot, ID-C112, available from Mitutoyo) having a circular cross-section and a diameter of about 10 mm. An average from ten times of measurement was calculated as a thickness of each carbon substrate or each gas diffusion layer.

Evaluation Example 5

Areal Weight Measurement

A length and width of each carbon substrate or each gas diffusion layer was measured using a measuring device (ID-C112, available from Mitutoyo). A weight of the carbon substrate or the gas diffusion layer was measured on a scale (0.01 g scale), which was then divided by the area of each carbon substrate or each gas diffusion layer to obtain an areal weight.

Evaluation Example 6

Bending Strength Measurement

A bending strength of each carbon substrate or each gas diffusion layer was measured at room temperature according to ASTM D5342, using a TABER® 150E stiffness tester (available from Taber, USA).

Example 2

70 g of carbon fiber having a carbon content of about 95%, a diameter of about 7 μm, and a fiber length of about 6 mm (T300, available from Toray), 30 g of carbon fiber having a carbon content of about 95%, a diameter of about 7 μm, and a fiber length of about 12 mm (T300, available from Toray), 1 g of dispersant (TRITON X-100), and 5 g of PVA staple fiber having a fiber length of about 6 mm (RMS702, available from Nycon) were put into 200 L of water, and mechanically mixed at a rate of about 1,500 rpm for about 20 minutes to obtain a homogeneous dispersion for forming a carbon fiber preweb.

The dispersion was put into an agitator of an inclined Fourdrinier-type paper-making machine. 300 L of water was further added thereinto and stirred. The dispersion was poured into the inclined Fourdrinier-type paper-making machine equipped with a 120# wire mesh, followed by pumping with a vacuum pump to remove water from the dispersion through the wire mesh to deposit carbon fibers on the wire mesh, thereby forming a carbon fiber preweb in the form of a non-woven fabric.

The carbon fiber preweb was impregnated with a slurry (a weight ratio of a phenol resin to graphite particles of 50:50, a total solid content of about 20 wt %) of graphite particles (Product No. 5991, available from Asbury Carbons) dispersed in a phenol resin solution (a weight average molecular weight of about 3,000 to about 5,000, and N-methyl-2-pyrrolidone used as a solvent) to include about 3 mg/cm$^2$ of the slurry. The carbon fiber preweb impregnated with the phenol resin and electroconductive graphite particles was heated at about 1,200° C. to about 1,600° C. in a nitrogen atmosphere to carbonize the phenol resin and PVA, thereby obtaining a carbon fiber web including a carbide binding the carbon fibers.

A PTFE emulsion (TEFLON® 30J, available from Dupont) as a fluorine-based resin having an average particle diameter of about 0.2 μm was dispersed in water to prepare a fluorine-based resin emulsion having a solid content of about 10 wt %. The carbon fiber web was impregnated with the fluorine-based resin emulsion, followed by removing the fluorine-based resin emulsion from a surface of the carbon fiber web, drying at about 120° C., and further thermal treatment in a 350° C. oven for about 30 minutes, thereby obtaining a hydrophobicized carbon fiber substrate.

Examples 3-4 and Comparative Examples 3-4

Hydrophobicized carbon fiber substrates were manufactured in the same manner as in Example 2, except that the amounts of the carbon fiber having a fiber length of about 6 mm and the carbon fiber having a fiber length of about 12 mm were varied (Examples 3 and 4). In Comparative Examples 3 and 4, hydrophobicized carbon fiber substrates were manufactured using only the carbon fibers having a fiber length of about 6 nm or a length of about 12 mm in the same manner as in Example 2.

Figure 12:
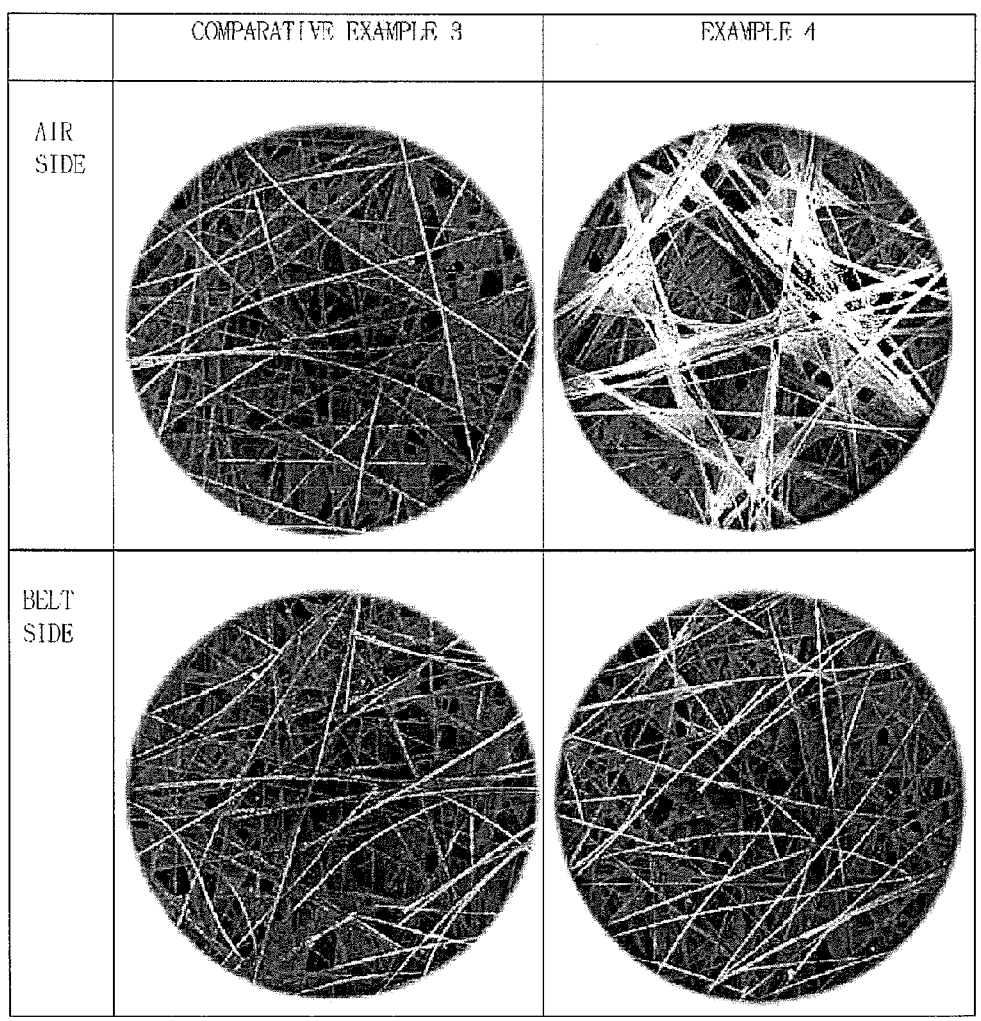
FIG. 12 illustrates scanning electron microscopic (SEM) images of surface states of carbon substrates of Comparative Example 3 and Example 3.

FIG. 12 illustrates scanning electron microscopic (SEM) images at a 1,000× magnification of surface states of carbon substrates of Comparative Example 3 and Example 4. Referring to FIG. 12, the carbon substrate of Comparative Example 3 is found to have nearly no difference in carbon fiber distribution state, porosity, and pore size between an upper surface (air side) and a lower surface (belt side) of the carbon substrate, while the carbon substrate of Example 4 has large differences in carbon fiber distribution state, porosity, and pore size between the upper surface and the lower surface thereof. In the carbon substrate of Example 4, a large pore having a width of about 300 μm to about 900 μm, and a medium pore or small pore having a width of about 10 μm or greater to less than 300 μm were co-present in the upper surface (air side), and a medium or small pore having a width of about 10 μm to about 100 μm was uniformly distributed in the lower surface (belt side). However, the carbon substrate of Comparative Example 3 had a uniform distribution of pores having a width of about 85 μm to about 160 μm both in the air side surface and the belt side surface thereof. Accordingly, when a gas diffusion layer is manufactured by coating a microporous layer on the carbon substrate of Comparative Example 3, it is expected that water may likely be discharged only by a pressure difference at an interface between the microporous layer and the carbon substrate that results from a difference in pore size between the microporous layer and the carbon substrate.

Referring to Table 1 below, the carbon substrates of Examples 2, 3, and 4 manufactured using a mixture of longer carbon fibers and shorter carbon fibers are found to have more strong bending strengths, and in particular, at a larger ratio of longer carbon fiber to shorter carbon fiber, than the carbon substrates of Comparative Examples 3 and 4 including only one kind of carbon fiber. The carbon substrates of Examples 2, 3 and 4 are found to have a remarkable increase in bending strength both in the MD and CMD by from about 31.8% to about 63.6% and from about 87.5% to about 250%, respectively.

TABLE 1

|  |  | E* 2 | E 3 | E 4 | CE** 3 | CE 4 |
|---|---|---|---|---|---|---|
| Amounts of carbon fiber | 6 mm-length carbon fiber (g) | 70 | 50 | 30 | 100 | — |
|  | 12 mm-length carbon fiber(g) | 30 | 50 | 70 | — | 100 |
| Carbon substrate characteristics | Areal weight (g/m2) | 65 ± 5 | 65 ± 5 | 65 ± 5 | 65 ± 5 | 65 ± 5 |
|  | Thickness(μm) | 270 ± 20 | 270 ± 20 | 270 ± 20 | 280 ± 20 | 260 ± 20 |
|  | MD bending strength | 29 ± 3 | 32 ± 2 | 36 ± 3 | 22 ± 1 | 26 ± 2 |

TABLE 1-continued

|  | E* 2 | E 3 | E 4 | CE** 3 | CE 4 |
|---|---|---|---|---|---|
| (gf · cm) |  |  |  |  |  |
| CMD bending strength (gf · cm) | 30 ± 2 | 33 ± 3 | 40 ± 4 | 16 ± 2 | 23 ± 3 |

*E: Example,
**CE: Comparative Example

Examples 5-7 and Comparative Example 5

Gas diffusion layers (GFLs) were manufactured in the same manner as in Example 1 by coating microporous layers on the carbon substrates of Example 4. In Example 5, a slurry excluding thermoexpandable graphite was coated on the carbon substrate of Example 4 to form a microporous layer. In Examples 6 and 7, microporous layers with a porosity gradient in the same direction as that of a porosity gradient in the carbon substrate were manufactured. In Comparative Example 5, a larger amount of thermoexpandable graphite was used in the second microporous layer than in the first microporous layer to induce a porosity gradient in the first and second microporous layer in a direction opposite to that of a porosity gradient in the carbon substrate. The amounts of carbon black (VULCAN XC-72) and thermoexpandable graphite (Ecophit® G) were varied as in Table 2.

Referring to Table 2, the gas diffusion layers of Examples 5 to 7 have improvements in MD bending strength and CMD bending strength, and in particular, a higher CMD bending strength than the MD bending strength, and have improved water discharge ability, and consequently improved single cell performance.

However, the gas diffusion layer of Comparative Example 5 with a porosity gradient in a direction opposite to that the porosity gradient of the microporous layer had improved mechanical performance, but poor single cell performance.

Figure 13:
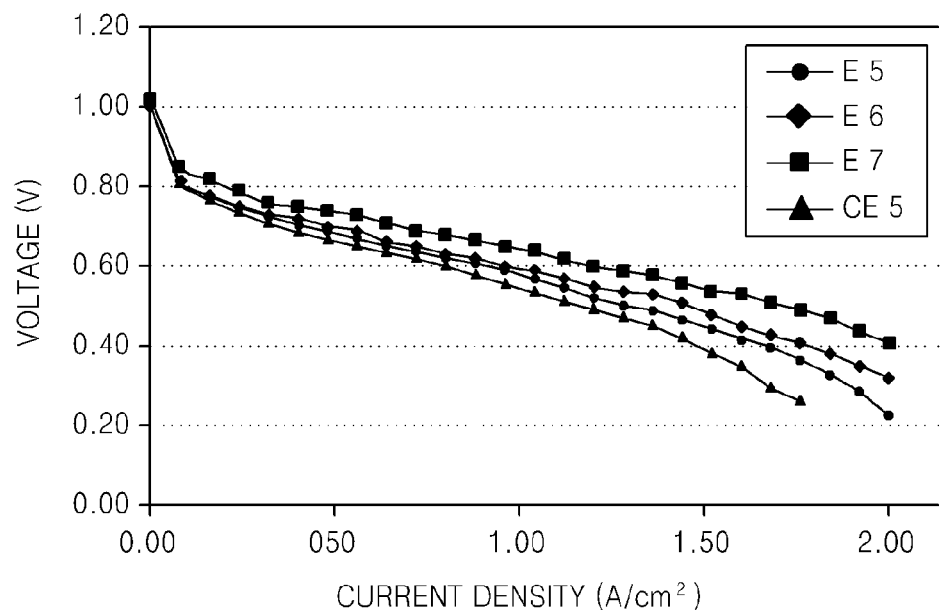
FIG. 13 is a graph illustrating performance changes in single cells using the gas diffusion layers of Examples 5 to 7 and Comparative Example 5.

FIG. 13 is a graph illustrating performance changes in single cells using the gas diffusion layers of Examples 5 to 7 and Comparative Example 5, respectively, measured through the single cell test explained above. Referring to FIG. 13, the single cells including the microporous layers with a porosity gradient in the same direction as a porosity gradient of the carbon substrate are improved in single cell performance by about 30% (Example 7), while the single cell including the microporous layer of Comparative Example 5 with a porosity gradient in a direction opposite to a porosity gradient of the carbon substrate is deteriorated in terms of cell performance, though it maintains a good mechanical performance.

Figure 14:
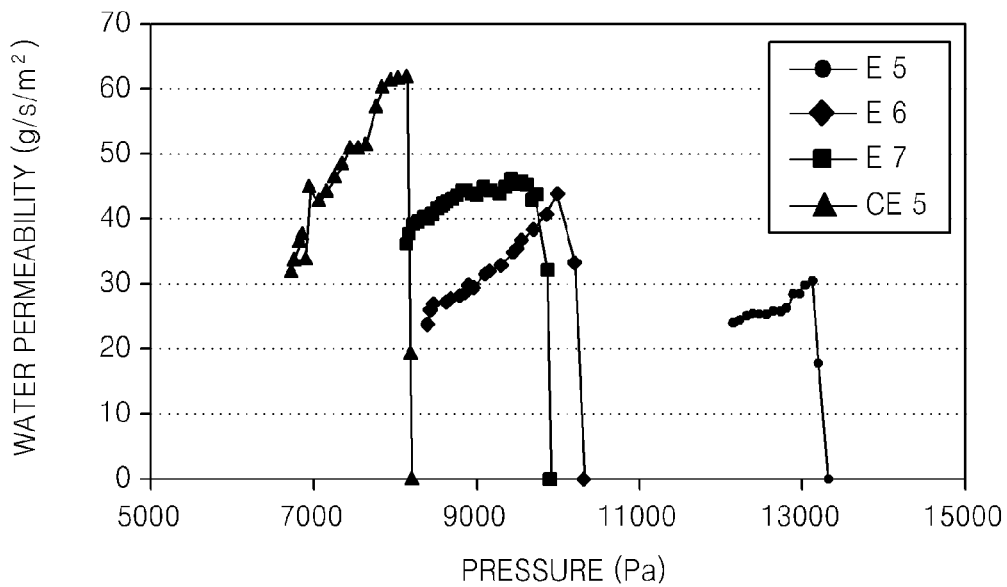
FIG. 14 is a graph of change in water permeability in the gas diffusion layers of Examples 5 to 7 and Comparative Example 5.

FIG. 14 is a graph of change in water permeability in the gas diffusion layers of Examples 5 to 7 and Comparative Example 5, obtained through the water permeability measurement explained above. Referring to FIG. 4, the gas diffusion layers of Examples 6 and 7 with a porosity gradient continuously formed across the whole of the carbon substrate and the microporous layer, obtained using an appropriate use of hydrophilic thermoexpandable graphite in the microporous layer, are found to have appropriate water permeabilities as described in the context relevant to FIGS. 10 and 11, which may consequently lead to improved cell performance characteristics as described above. However, the gas diffusion layer of Comparative Example 5 with a porosity gradient in the microporous layer in a direction opposite to that of a porosity gradient of the carbon substrate has a higher water permeability than the other gas diffusion layers, but has a relatively low proportion of pores available for flow-in or flow-out of fuel gas and oxidant gas due to an increased water uptake in the gas diffusion layer, so that cell performance starts to deteriorate in a low current density region, as shown in FIG. 13.

Evaluation Example 7

Resistance Measurement

Resistances of the gas diffusion layers of Examples 5 to 7 and Comparative Example 5 were measured. In particular, while four gas diffusion layers were placed between gold-coated Cu plates, a current of about 1 A was flowed in the thickness direction of the gas diffusion layers under a pressure of about 600N to measure a decrease in voltage (V). A decrease in voltage was measured using only two gas diffusion layers, and an electrical resistance of each gas diffusion layer was calculated from a difference in resistance of the two measurements.

TABLE 2

|  |  |  | E* 5 | E 6 | E 7 | CE* 5 |
|---|---|---|---|---|---|---|
| Amounts of carbon fiber | 6 mm-length carbon fiber (g) |  | 30 | | | |
|  | 12 mm-length carbon fiber (g) |  | 70 | | | |
| Carbon substrate characteristics | Areal weight (g/m2) |  | 65 ± 5 | | | |
|  | Thickness (μm) |  | 270 ± 20 | | | |
|  | MD bending strength (gf · cm) |  | 36 ± 3 | | | |
|  | CMD bending strength (gf · cm) |  | 40 ± 4 | | | |
| MPL structure | First layer | Carbon black(g) | 100 | 85 | 85 | 100 |
|  |  | Thermoexpandable graphite(g) | 0 | 15 | 15 | 15 |
|  | Second | Carbon | 100 | 100 | 94.5 | 80.5 |

TABLE 2-continued

|  |  | E* 5 | E 6 | E 7 | CE* 5 |
|---|---|---|---|---|---|
| | layer black(g) | | | | |
| | Thermoexpandable graphite(g) | 0 | 0 | 5.5 | 19.5 |
| GDL characteristics | Areal weight (g/m2) | 115 ± 5 | | | |
| | Thickness (μm) | 320 ± 20 | | | |
| | Resistance (mΩ · cm2) | 13 | 12 | 10 | 9 |
| | Porosity (%) | 76 | 76.5 | 77 | 78 |
| | MD bending strength (gf · cm) | 36 ± 3 | 37 ± 2 | 36 ± 1 | 37 ± 2 |
| | CMD bending strength (gf · cm) | 40 ± 4 | 40 ± 3 | 39 ± 2 | 39 ± 2 |
| | Current density @ 0.6 V (A/cm2) | 0.92 | 0.96 | 1.20 | 0.80 |

*E: Example,
**CE: Comparative Example

Figure 15:
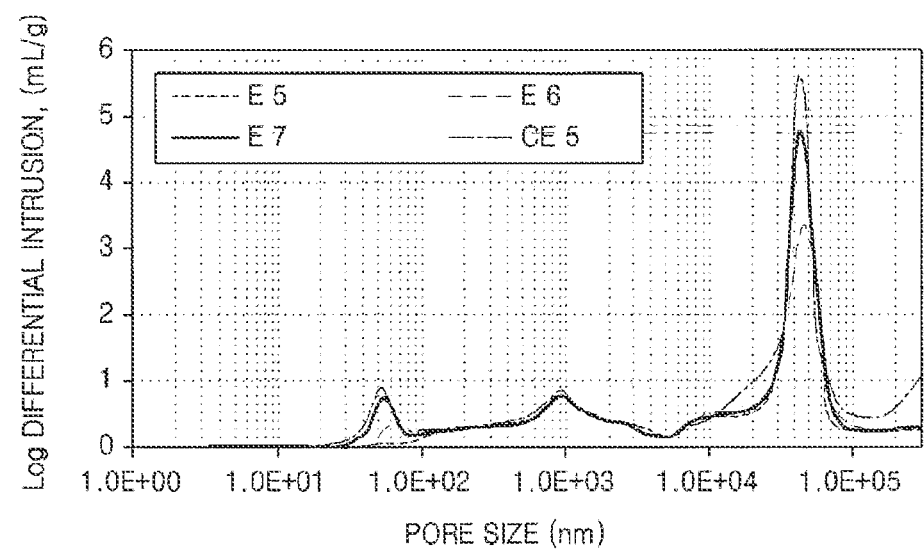
FIG. 15 is a graph of pore size distribution in the gas diffusion layers of Examples 5 to 7 and Comparative Example 5.

FIG. 15 is a graph of pore size distribution in the gas diffusion layers of Examples 5 to 7 and Comparative Example 5, obtained by using the pore size distribution evaluation as explained above. Referring to FIG. 15, the larger the amount of thermoexpandable graphite in the microporous layer, the larger the porosity of the gas diffusion layer becomes. When the amount of the thermoexpandable graphite in the microporous layer was increased, a pore distribution in regions having a pore size of about 4 nm to about 8 nm and a pore size of about 10 μm to about 100 μm was changed. However, a sharp volume expansion of excess thermoexpandable graphite in the second microporous layer may likely cause a crack in the microporous layer.

Figure 16:
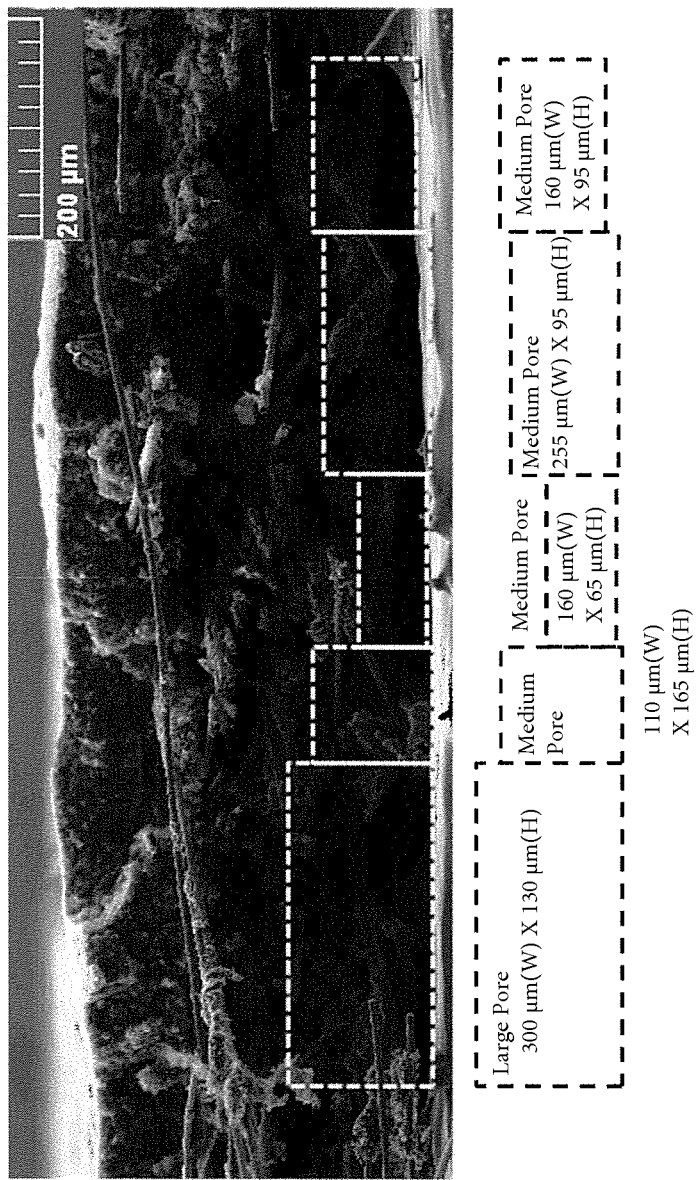
FIGS. 16 to 18 are SEM images of cross-sections of the gas diffusion layers of Comparative Example 2 and Examples 5 and 7, respectively, and pore distribution analysis charts obtained based on the SEM images.
Figure 17:
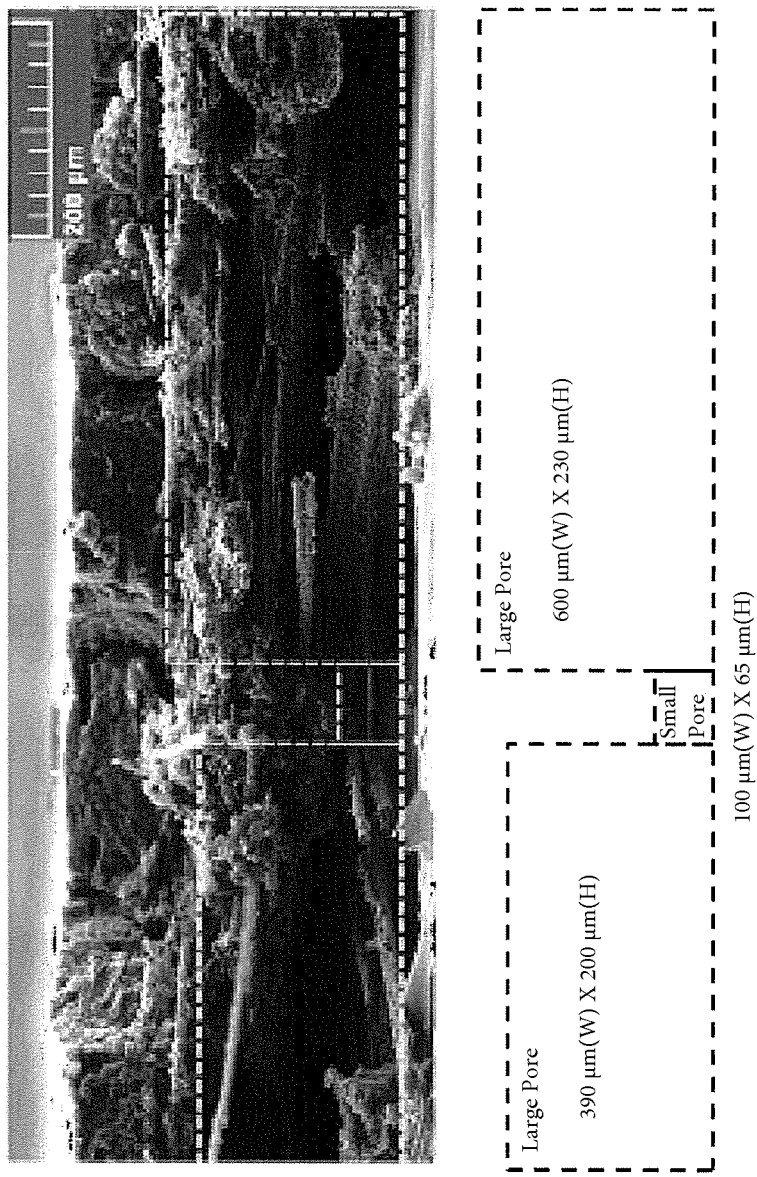
Figure 18:
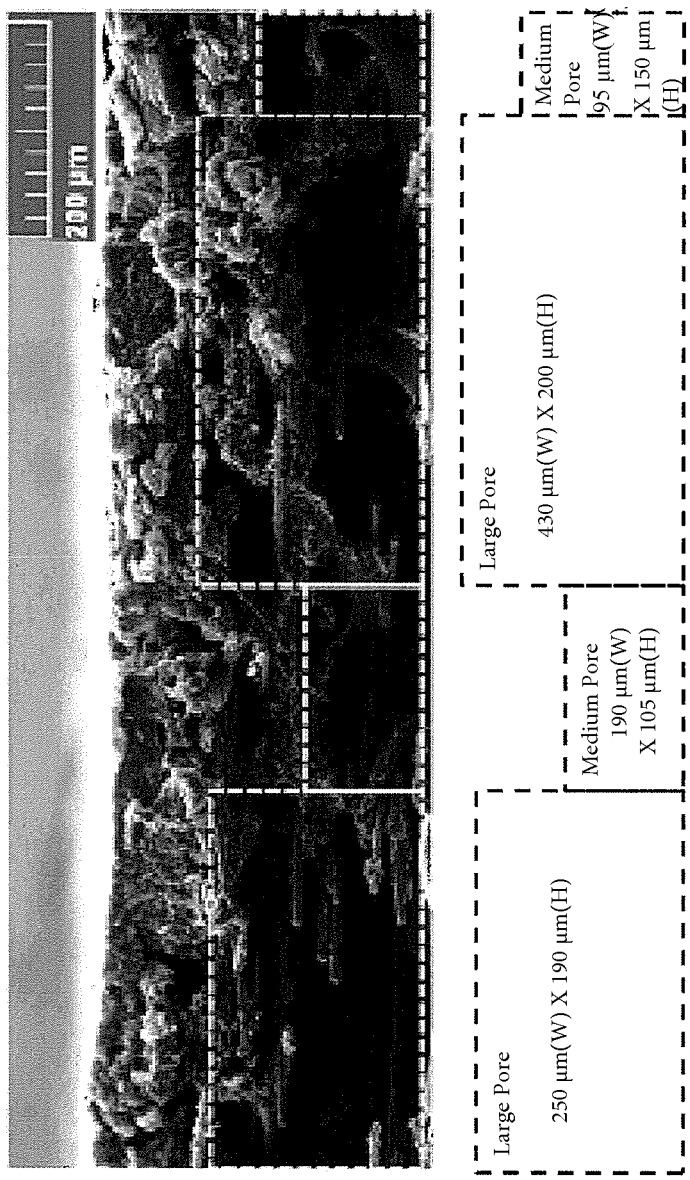

FIGS. 16 to 18 are SEM images of cross-sections of the gas diffusion layers of Comparative Example 2 and Examples 5 and 7, respectively, and pore distribution analysis charts obtained based on the SEM images. Referring to FIGS. 16 to 18, in the carbon substrates of Examples 5 and 7 (FIGS. 17 and 18) with a porosity gradient obtained through controlling floating times of the carbon fibers, a large pore and a medium or small pore were co-present in a region that will be adjacent to a bipolar plate of a fuel cell, when mounted in the fuel cell. That is, in cross-sections of the gas diffusion layers of Examples 5 and 7 observed in a direction perpendicular to the cross-section, a large pore having a width of about 300 μm or greater and a medium or small pore having a width of about 50 μm to about 100 μm were co-present. The co-presence of pores having different size is more advantageous in terms of water management. In particular, the large pores of these pores having different sizes are prone to uptake water generated in a fuel cell during operation, and allow it to be discharged rapidly in a flow channel direction from the gas diffusion layer. A concentration or amount gradient of hydrophilic thermoexpandable graphite in the microporous layer, further to a porosity gradient of the carbon substrate, is found to improve water discharge ability.

Meanwhile, in a cross-section of the gas diffusion layer of Comparative Example 2 (FIG. 16) without a porosity gradient, observed in a direction perpendicular to the cross-section, pores having a uniform size of about 100 μm to about 300 μm appeared. This means that a driving force for water discharge during an operation of a fuel cell is uniform over the gas diffusion layer, which may hinder rapid water discharge.

As described above, according to the one or more embodiments, a fuel cell with less performance deterioration caused from water flooding may be manufactured using a carbon substrate for a gas diffusion layer with improved water discharge ability that allows efficient discharge of water generation during an operation of the fuel cell.

A carbon substrate for a gas diffusion layer with a porosity gradient, according to the above-embodiments of the present invention, may have improved water discharge ability and improved mechanical strength, and thus may improve performance of a fuel cell including the same. In particular, when a microporous layer with a porosity gradient is formed on the carbon substrate also with a porosity gradient, the water discharge ability and mechanical strength of the gas diffusion layer such as bending strength, and cell performance may be further improved. Implementing a porosity gradient in a carbon substrate for a gas diffusion layer that is continuous from the porosity gradient of the microporous layer may improve water discharge ability and may lower resistance against mass transfer in a high current density region, consequently improving performance of a fuel cell.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A carbon substrate for a gas diffusion layer, as a porous carbon substrate with first and second surfaces opposite to each other, the carbon substrate comprising:
   at least two types of carbon fibers having different lengths and randomly disposed to form a non-woven fabric; and a carbide of an organic polymer disposed between the carbon fibers to bind the same,
   wherein first carbon fibers having shorter lengths are predominantly disposed to be closer to the first surface of the carbon substrate in a thickness direction of the carbon substrate, and second carbon fibers having longer lengths than the first carbon fibers are predominantly disposed to be closer to the second surface of the carbon substrate, so that the carbon substrate has a porosity gradient in the thickness direction of the carbon substrate that increases toward the second surface from the first surface of the carbon substrate,
   wherein a large pore having a width of 300 μm to 900 μm, and a medium pore or small pore having a width of about 10 μm or greater to less than 300 μm are co-present in the second surface, and a medium or small pore having a width of about 10 μm to about 100 μm is uniformly distributed in the first surface.

2. The carbon substrate of claim 1, wherein the carbon substrate has a density gradient in the thickness direction of the carbon substrate that decreases toward the second surface from the first surface of the carbon substrate.

3. The carbon substrate of claim 1, wherein the first and second carbon fibers have a length from about 3 mm to about 25 mm, and a length difference between the first and second carbon fibers is from about 3 mm to about 20 mm.

4. A gas diffusion layer for a fuel cell, comprising: the carbon substrate of claim 1; and a microporous layer disposed on the first surface of the carbon substrate and having an average pore size that is smaller than an average pore size of the carbon substrate in a region adjacent to the microporous layer.

5. The gas diffusion layer of claim 4, wherein the microporous layer has a porosity gradient in the thickness direction of the carbon substrate such that the pore size thereof increases toward the second surface from the first surface.

6. The gas diffusion layer of claim 4, wherein the microporous layer comprises carbon powder, thermoexpandable graphite, and a fluorine-based binder fused between the carbon powder and the thermoexpandable graphite.

7. The gas diffusion layer of claim 6, wherein an amount of the thermoexpandable graphite increases toward the second surface of the carbon substrate from the first surface of the carbon substrate in the thickness direction of the carbon substrate,
wherein the microporous layer comprises a sequential stack structure of a first microporous layer and a second microporous layer, and an amount of the thermoexpandable graphite in the first microporous layer is larger than that in the second microporous layer, and
wherein the amount of the thermoexpandable graphite in the first microporous layer is from about 5 parts to about 20 parts by weight based on 100 parts by weight of a total weight of the carbon powder and the thermoexpandable graphite, and the amount of the thermoexpandable graphite in the second microporous layer is from about 5 parts to about 10 parts by weight based on 100 parts by weight of a total weight of the carbon powder and the thermoexpandable graphite.

8. An electrode for a fuel cell, comprising the gas diffusion layer of claim 4, and a catalyst layer disposed on the microporous layer of the gas diffusion layer.

* * * * *